United States Patent
Ventz et al.

(10) Patent No.: US 9,120,628 B2
(45) Date of Patent: Sep. 1, 2015

(54) CURVED BELT CONVEYOR AND RETAINING ELEMENT WITH ROLLERS FOR A CURVED BELT CONVEYOR

(75) Inventors: Kai Ventz, Hildesheim (DE); René Schällig, Hildesheim (DE)

(73) Assignee: TRANSNORM SYSTEM GmbH (DE)

( * ) Notice: Subject to any disclaimer, the term of this patent is extended or adjusted under 35 U.S.C. 154(b) by 91 days.

(21) Appl. No.: 14/110,771

(22) PCT Filed: Apr. 14, 2011

(86) PCT No.: PCT/DE2011/000410
§ 371 (c)(1),
(2), (4) Date: Oct. 9, 2013

(87) PCT Pub. No.: WO2012/139538
PCT Pub. Date: Oct. 18, 2012

(65) Prior Publication Data
US 2014/0027248 A1 Jan. 30, 2014

(51) Int. Cl.
*B65G 21/16* (2006.01)
*B65G 15/02* (2006.01)
*B65G 15/60* (2006.01)
*B65G 21/06* (2006.01)

(52) U.S. Cl.
CPC .............. *B65G 15/60* (2013.01); *B65G 15/02* (2013.01); *B65G 21/06* (2013.01); *B65G 21/16* (2013.01)

(58) Field of Classification Search
CPC ......... B65G 15/02; B65G 15/28; B65G 21/16

USPC ......................................................... 198/831
See application file for complete search history.

(56) References Cited

U.S. PATENT DOCUMENTS

| | | | |
|---|---|---|---|
| 5,394,977 A * | 3/1995 | Cline ............................ | 198/831 |
| 5,944,171 A | 8/1999 | Vertogen et al. | |
| 6,962,252 B2 * | 11/2005 | Fujiwara et al. .............. | 198/837 |
| 7,073,660 B1 * | 7/2006 | Hishinuma ..................... | 198/831 |
| 7,232,030 B2 * | 6/2007 | Duncan et al. ................ | 198/831 |
| 8,167,121 B2 | 5/2012 | Yuasa et al. | |
| 8,186,504 B2 * | 5/2012 | Schoning et al. ............. | 198/842 |
| 2004/0035685 A1 * | 2/2004 | Fujiwara et al. .............. | 198/831 |

FOREIGN PATENT DOCUMENTS

| | | |
|---|---|---|
| CN | 201086992 | 7/2008 |
| DE | 38 26 953 | 1/1990 |
| EP | 0 699 166 B1 | 7/2001 |
| EP | 1 688 373 A1 | 8/2006 |

(Continued)

OTHER PUBLICATIONS

International Search Report for PCT/DE2011/000410 (WO 2012/139538 A1) dated Feb. 1, 2012.

*Primary Examiner* — James R Bidwell
(74) *Attorney, Agent, or Firm* — Kenneth F. Pearce

(57) ABSTRACT

A curved belt conveyor has a conveying belt (3). The conveyor includes an application element (8) guided by a plurality of rollers (20) arranged in pairs. Each pair of rollers (20) is arranged on a retaining element (10). The retaining element (10) has a U-shaped profile with a base (11) and two limbs (12, 13). Rollers (20) are fastened on the opposite limbs (12, 13) of the U-shaped profile via associated roller holders (25).

20 Claims, 4 Drawing Sheets

(56) References Cited

FOREIGN PATENT DOCUMENTS

Figure 1:
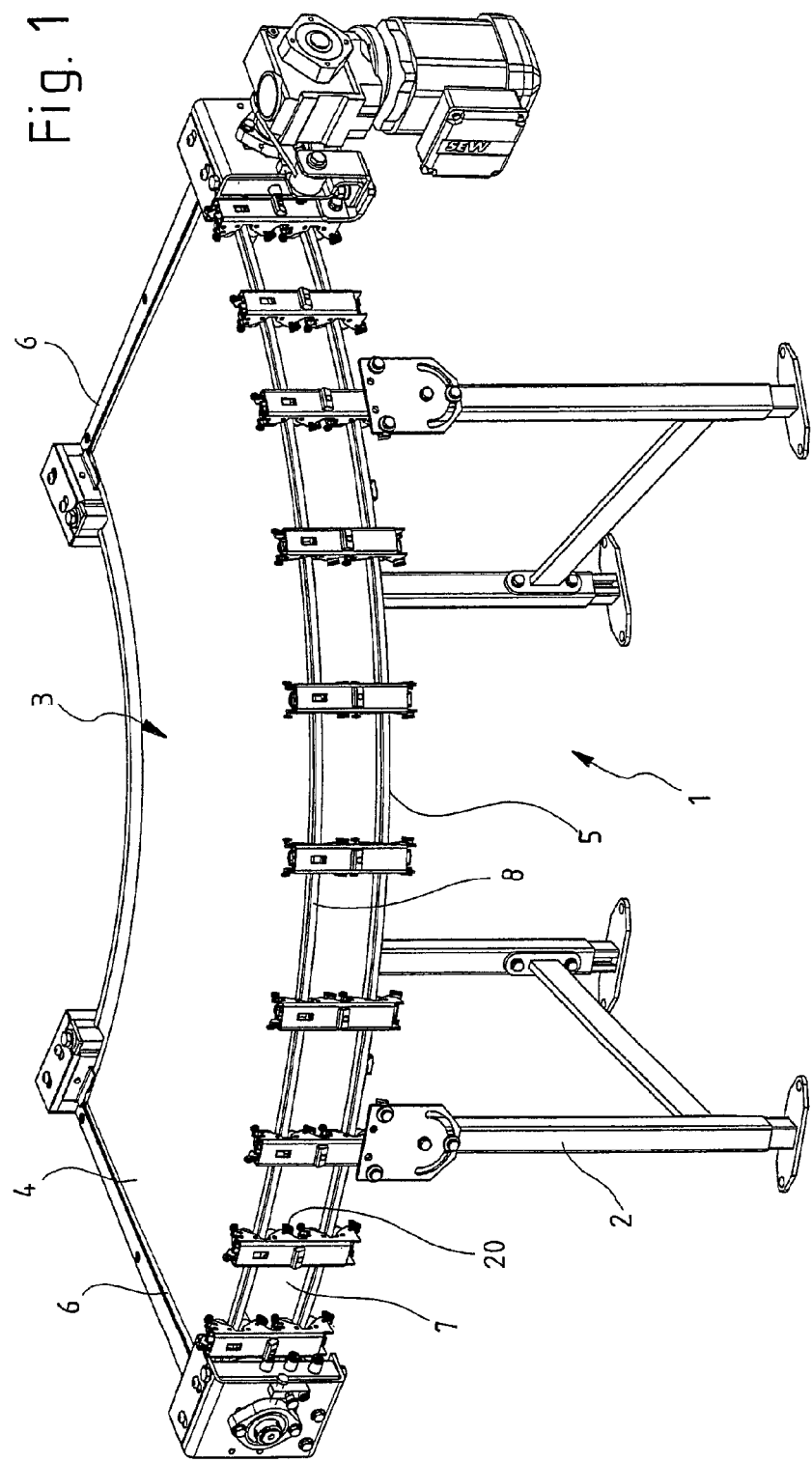

| JP | 2001122413 | 5/2001 |
| JP | 2006213487 | 8/2006 |
| JP | 4445076 | 4/2010 |

* cited by examiner

CURVED BELT CONVEYOR AND RETAINING ELEMENT WITH ROLLERS FOR A CURVED BELT CONVEYOR

The invention relates to a curved belt conveyor with a conveying belt which, in the region of the edge which forms the outer periphery, has an application element which is guided by a plurality of rollers arranged in pairs, wherein each pair of rollers is arranged on a retaining element. The invention further relates to a retaining element with a pair of rollers arranged thereon for use in such a curved belt conveyor.

A generic curved belt conveyor is described in DE 10 2006 535 B4 or respectively EP 2 027 044 A1. In the region of the outer radius a plurality of pairs of rollers are arranged which engage the conveying belt on a bead-like edge and thereby guide it. Here, in vertical respect, four rollers are arranged respectively one over another on a retaining element, wherein the upper pair of rollers guides the part of the conveying belt on the upper run and the lower pair of rollers guides the part of the conveying belt on the lower run. The rollers are mounted and pivotable with their rotation axis via a lever eccentrically, i.e. parallel and spaced apart, with respect to the rotation axis of the pivot element.

Another solution is known for example from EP 2 275 365 A1, in which the outer rollers of the pairs of rollers are arranged on C-shaped brackets which are able to be pivoted away outwards.

The invention is based on the problem of providing a curved belt conveyor of the type named in the introduction, which is constructed in a particularly straightforward and stable manner in particular in the region of the guide rollers.

The solution to this problem is effected by a curved belt conveyor having the features of Claim 1. Advantageous further developments of the invention are described in the subclaims.

In a curved belt conveyor with a conveying belt which, in the region of the edge which forms the outer periphery, has an application element which is guided by a plurality of rollers arranged in pairs, wherein each pair of rollers is arranged on a retaining element, provision is made in a manner essential to the invention, that the retaining element is designed as a U-shaped profile with a base and two limbs and that the rollers are fastened on the opposite limbs of the U-shaped profile via associated roller holders.

Thereby, a retaining element results which is constructed in a very straightforward and, at the same time, very stable manner. The retaining element is also stable in itself and can be readily mounted on other elements such as an outer frame of the curved belt conveyor, wherein then the other elements no longer have to provide the overall stability for receiving the rollers, because this is achieved by the U-shaped profile.

Preferably, each roller is mounted on a roller holder and each roller holder is fastened to the limbs of the U-shaped profile. The roller holder is fastened here on both sides of the U-shaped profile, i.e. on both opposite limbs of the U-shaped profile and preferably here on the sides of the limbs of the U-shaped profile lying on the inside. The spacing of the limbs of the U-shaped profile corresponds here preferably substantially approximately to the diameter of the rollers or respectively is formed somewhat greater. The rollers are then arranged somewhat above the limbs by the roller holder, which is arranged between the limbs, but can be pivoted between the limbs. Overall in this way a very high degree of stability is produced.

In a preferred embodiment of the invention, the rotation axis at least of one roller of two rollers arranged in pairs is pivotable in a plane which lies parallel between the limbs of the U-shaped profile. Thereby, at least one roller of a pair of rollers can be moved away from the conveying belt and towards the conveying belt. The conveying belt, which is fixed between the rollers with the application element can then be easily removed and, if applicable, renewed. A maintenance of the curved belt conveyor according to the invention is thereby very easily possible. For this, the roller holder for at least one roller on each limb has two fastening points, wherein the fastening point which faces the conveying belt enables a rotary movement about this fastening point, and the fastening point which faces away from the conveying belt is adjustable between two positions so that in one position the roller lies against the conveying belt and in another position the roller frees the conveying belt. The roller is pivoted here in a plane in which the rotation axis of the roller also lies. The entire roller holder is pivoted here between the limbs of the U-shaped profile. The spacing of the limbs with respect to one another is so great that the roller is also able to be pivoted between the limbs.

In order to realize such a pivotability, the roller holder is preferably deformable mechanically, so that a fastening point of the roller holder is reversibly releasable. Advantageously here the fastening point facing away from the conveying belt is reversibly releasable. A fastening point is preferably constructed by corresponding detent elements on an actuating lever of the roller holder and the associated limb of the U-shaped profile. In an embodiment, the actuating lever has a detent nose which is able to be fixed reversibly on the inner side into one of several detent recesses in the limb of the U-shaped profile. A reverse construction is also conceivable, in which a detent recess is provided in the actuating lever, which detent recess is pushed onto one of several projecting detent noses on the limbs. In the limbs of the U-shaped profile preferably two detent elements, in particular detent recesses, are provided, so that the roller is able to be fixed in a first position in which it engages the conveying belt or respectively the application element, in particular a bead-shaped edge, and is able to be fixed in a second position, in which the roller frees the conveying belt, so that the latter can be removed or respectively exchanged. The roller holder is advantageously constructed rigidly in the region of the fastening point facing the conveying belt and of the mount of the roller, and is constructed less rigidly, by comparison, in the region of the fastening point facing away from the conveying belt, in particular in the region of the actuating lever. Preferably, the roller holder is constructed from plastic, in particular as an injection moulded part, wherein the individual wall sections of the injection moulded part are constructed to be so strong that the roller holder has a sufficient stability for receiving and bearing the roller. In the region of the actuating lever, however, the wall is constructed with a weakening or tapering, so that the actuating levers are movable, in particular can be pressed inwards between the limbs of the U-shaped profile, so that the outwardly projecting detent noses are able to be pressed out from the detent recesses in the limbs.

In another preferred embodiment of the limbs, the limbs of the U-shaped profile have a recess between two rollers forming a pair of rollers. In this recess the conveying belt and in particular the application element on the outer edge of the conveying belt can be guided through between the rollers forming a pair of rollers, without colliding with the limbs of the U-shaped profile. In a preferred embodiment of the invention, four rollers are arranged on a U-shaped profile which is constructed in one piece, wherein two rollers form a pair of rollers for the side of the conveying belt on the upper run, and two rollers form a pair of rollers for the side of the conveying belt on the lower run. Each U-shaped profile is provided here for vertical arrangement on the curved belt conveyor, in particular a side wall profile. Preferably recesses are provided in the base of the U-shaped profile, by which a connection of the U-shaped profile with the side wall profile is possible via screws and clamping blocks. Preferably, the limbs of the U-shaped profile have a further recess in the region between the pairs of rollers. This recess is dimensioned so that the actuating levers of the roller holders can be moved to and fro in this recess, so that the pivotability is also provided for the middle rollers of the four rollers arranged on the retaining element.

A further aspect of the invention consists in the provision of a retaining element for a curved belt conveyor of the type mentioned above, on which at least two rollers are arranged forming a pair of rollers, wherein the retaining element is constructed as a U-shaped profile with a base and two limbs and the rollers are fastened on the opposite limbs of the U-shaped profile. With regard to the further embodiment of such a retaining element, reference is to be made to the description of the curved belt conveyor given above, in which this retaining element was also discussed extensively.

Figure 2:
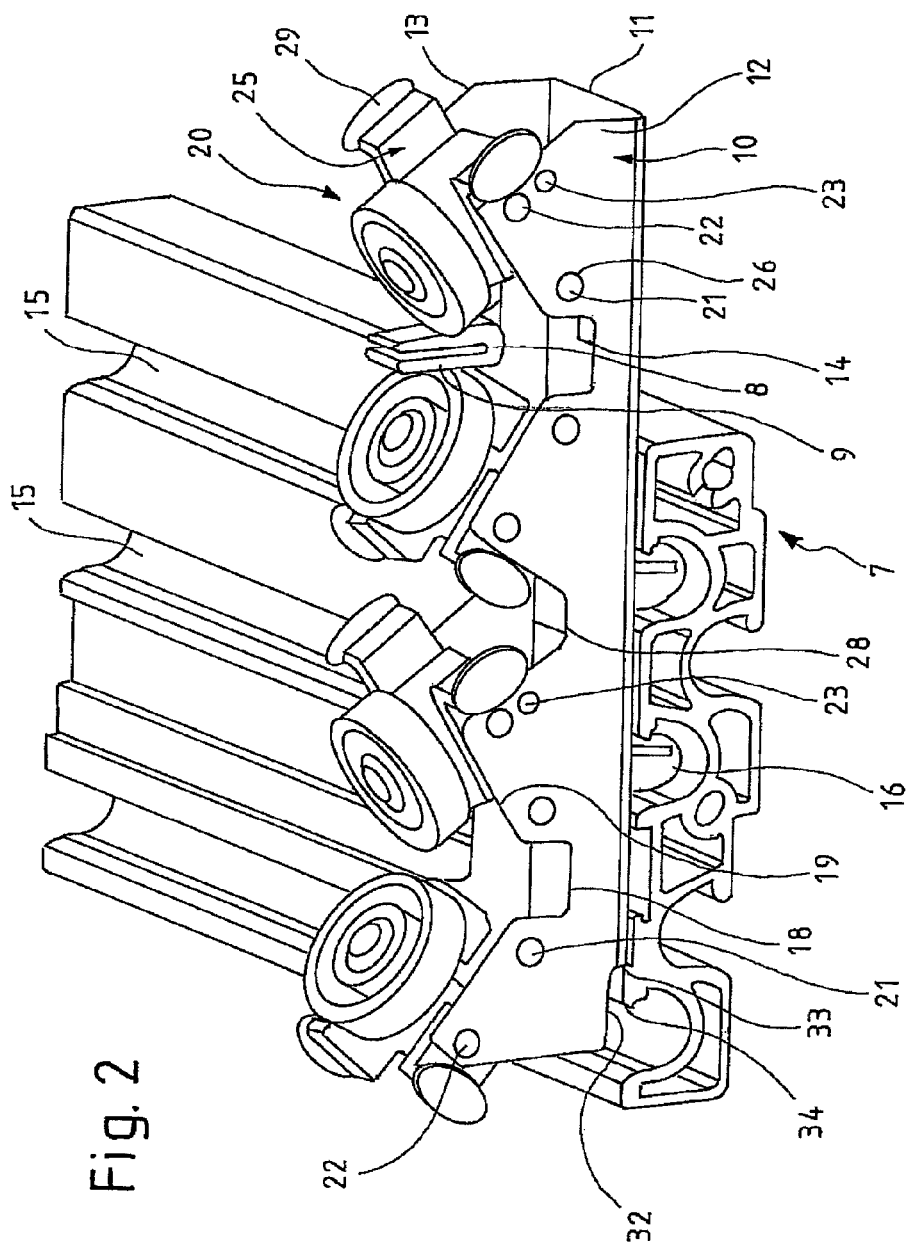
Figure 3:
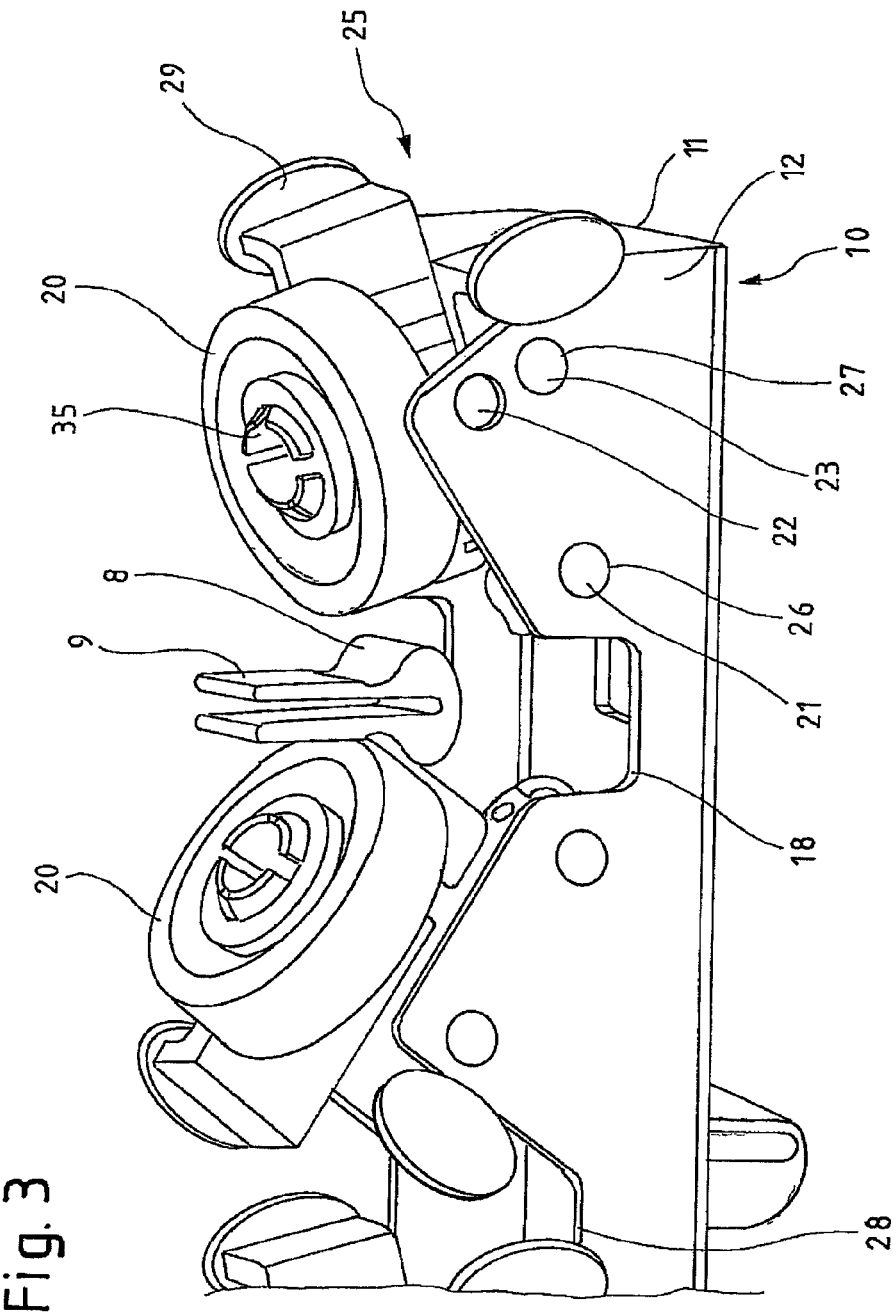
Figure 4:
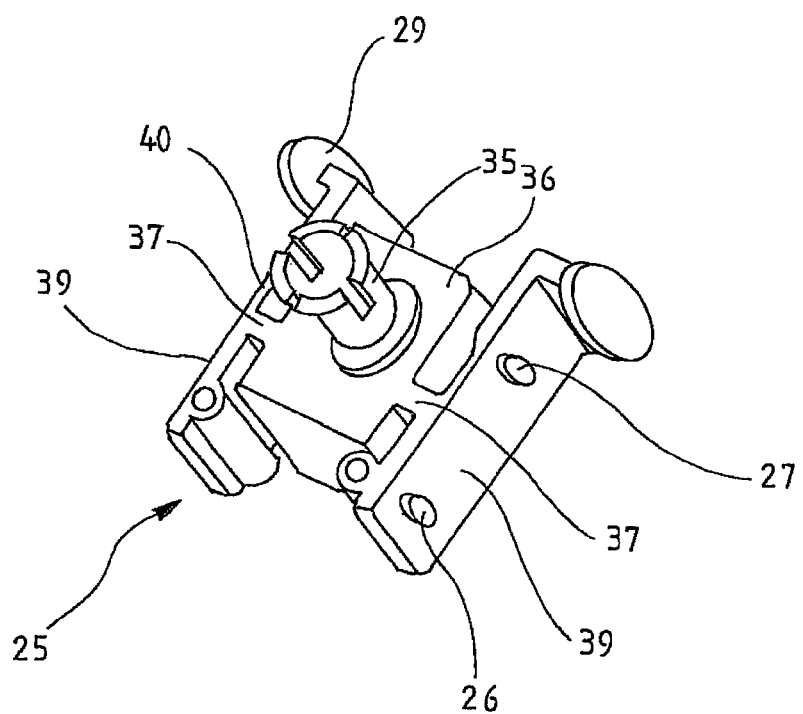

The invention is explained further below with the aid of an example embodiment illustrated in the drawings. The diagrammatic illustrations show, in detail, in:

FIG. 1: a diagrammatic view of a curved belt conveyor;

FIG. 2: a perspective view of a retaining element of the curved belt conveyor according to the invention, mounted in a side part of the curved belt conveyor;

FIG. 3: a perspective detail view of a retaining element in the state with exchangeable conveying belt;

FIG. 4: a perspective view of a roller holder.

In FIG. 1 a curved belt conveyor 1 is illustrated in perspective view. This has firstly a frame 2, on which a conveying belt 3 revolves, wherein a differentiation is made in the conveying belt between the side 4 on the upper run and the side 5 on the lower run. At the two ends of the curved belt conveyor deflection rollers 6 are provided, around which the conveying belt revolves. On a side wall profile 7, rollers 20 are provided, which engage an application element 8 arranged on the outer edge of the conveying belt 3, and in this way guide the conveying belt 3.

In FIG. 2 a perspective view is illustrated of a part of the side wall profile 7 with a retaining element 10, which is fastened to the side wall profile and on which four rollers 20 are mounted. The retaining element 10 is constructed in the manner of a U-shaped profile and has a base 11 or base section, from which two limbs 12 and 13 extend at right-angles parallel to one another. In the base 11 of the retaining element 10, which is constructed as a U-shaped profile, some recesses 14 are provided, by which a connection takes place of the retaining element 10 with the side wall profile 7. In the side wall profile 7 a plurality of grooves 15 are provided, in which clamping blocks 16 can be arranged, which are screwed with the retaining element 10 through the recesses 14 and fixed. The retaining element 10 as whole is aligned vertically, so that the four rollers 20 are arranged one over another. Between two rollers respectively, which form a pair of rollers, a conveying belt, in particular an application element 8 of the conveying belt, is guided. In the drawing, the application element 8 is illustrated with arms 9 constructed therewith. The conveying belt 3 is inserted between these arms 9 and is connected with the arms, for example by adhesion and/or a seam. The rollers 20 of a pair of rollers are at an angle between 100° and 120°, in particular 110° with respect to one another and thus act from both sides on the application element 8 of the conveying belt 3, which is not illustrated in FIG. 2. The rollers 20 are mounted on roller holders 25, which are received in turn in the retaining element 10. The retaining elements 25 are arranged on the opposite limbs 12, 13 of the retaining element 10, in particular are fastened on the inner sides of the limbs 12, 13. In order to be able to take the conveying belt and in particular the application element 8 out from the position between the rollers, it is necessary that at least one roller 20 is pivotably arranged. For this, a plurality of detent recesses 21, 22, 23 are provided in the limbs 12, 13. Here, one detent recess 21 is arranged on the side of the roller 20 facing the conveying belt and two detent recesses 22 and 23 are arranged with a slight distance to one another on the side of the limbs of the U-shaped profile facing away from the conveying belt. The roller holder 25 has two detent noses 26 and 27, which correspond to the detent recesses and form fastening points therewith. The detent nose 26 is arrested securely in the detent recess 21, wherein the roller holder 25 is pivotable about an axis running through the axis of the detent nose 26. On the side facing away from the conveying belt, the detent nose 27 can either be moved into the detent recess 22 or the detent recess 23. On the arresting of the detent nose 27 in the detent recess 22 illustrated in the figure, the conveying belt or respectively the application element 8 of the conveying belt is engaged by the rollers 20. When the roller holder 25 is moved downwards so that the detent nose 22 clicks into the detent recess 23, in so doing the entire roller 20 is pivoted downwards and the conveying belt is freed and can then be removed for maintenance purposes.

The change of the position takes place via actuating levers 29 provided on both sides on the roller holder 25, which can be pressed inwards by an operator, so that then the detent nose 27 is pressed out from the detent recess 22 inwards, can be displaced and then on releasing of the actuating lever 29 into the desired other position, i.e. in particular engages again the detent recesses 23. The retaining element 10, in particular the limbs 12 and 13 of the U-shaped profile have recesses 18 between the rollers 20—which are arranged in pairs—, so that the conveying belt can run in these. On both sides of the recess 18 the upper sections 19 of the limbs 12 and 13 are positioned and inclined to one another with an angle of approximately 55°. This upper section 19 is therefore parallel to the rollers 20 arranged in the engagement position. Two pairs of rollers are arranged on the retaining element 10 which is in a single piece. Two recesses 18 are provided here in the limbs, which are respectively arranged between two rollers of a pair of rollers. A second recess 28 is arranged between the two pairs of rollers and serves such that the roller holders 25 and in particular the actuating levers 29 which project over the retaining element 10 can be moved downwards. In addition, an asymmetry is also to be pointed out, resulting from the alignment of the retaining element 10, namely the recess 32 situated in the lower end region, through which an edge 33 is formed in the region of the base 11 of the retaining element 10, which edge strikes against a projecting shoulder 34 of the side wall profile 7. The end region is directed downwards, so that the force acting on the retaining element 10 can be still better supported mechanically on the side wall profile 7.

In FIG. 3 a perspective detail view of the retaining element 10 is illustrated, wherein the right-hand roller 20 in the figure is pivoted between the limbs 12 and 13 of the U-shaped profile. Thereby, the conveying belt or respectively the application element 8 arranged on the conveying belt is freed and the belt can be taken out. In contrast to FIG. 2, it can be clearly seen here that the detent nose 27 of the roller holder 25 is now no longer arrested in the detent recess 22, but rather in detent recess 23. The roller holder 25 is therefore pivoted downwards and hence also the roller 20, which rotates on the axis 35 of the roller holder 25, is also pivoted. The distances of the limbs 12 and 13 with respect to one another are dimensioned so that the roller 20 can be pivoted in straight between these.

In FIG. 4 a perspective view of a roller holder 25 is illustrated. The axis 35 arranged on the roller holder, and the lateral detent noses 26 and 27, and the actuating lever 29 have already been described. The axis 35 is arranged on a central and very stable middle block 36, which is connected via transverse struts 37 with the two outer side elements 39. The detent noses 26 and 27 are formed on the side elements 39, which are dimensioned so that they are fitted, lying closely on the inner side, between the limbs 12 and 13 of the retaining element. The side elements 39 are constructed rigidly in the front region, i.e. in particular between the detent nose 26 facing the belt up to the transverse strut 37. In the rear region, i.e. in particular between the transverse strut 37 and the rear detent nose 27, the side elements 39 have a material weakening 40, so that by pressure onto the actuating lever 39 a bending of the side elements 39 takes place, taking place in a defined manner in this region, so that the detent nose 27 can be moved out from the respective detent recess 22 or 23.

The invention claimed is:

1. A curved belt conveyor comprising:
   a) a sidewall;
   b) a conveyor belt and an application element associated with an outer periphery of said a conveyor belt;
   c) a plurality of pairs of rollers guiding said application element; and
   d) a plurality of retaining elements comprising generally U-shaped profiles and connected to said side wall of said curved conveyor, wherein each said retaining element further comprises:
      i) a base;
      ii) a pair of opposed limbs extending from said base; and
      iii) at least a pair of roller holders fastened to each of said opposed limbs, wherein:
         A) each roller holder holds a roller; and
         B) at least one of said roller holders is pivotable such that when said roller held by said pivotable roller holder does not contact said application element, said pivotable roller holder can move said roller held by said pivotable roller holder between said opposed limbs, and wherein a rotation axis of said roller is pivotable in a plane parallel with said pair of opposed limbs.

2. The curved belt conveyor of claim 1, wherein said limbs comprise a first fastening point and a second fastening point capable of engaging said pivotable roller holder such that:
   a) on engagement of said pivotable roller holder with said first fastening point, said application element is gripped; and
   b) on engagement of said pivotable roller holder with a second fastening point, said application element is released.

3. The curved belt conveyor of claim 2, wherein said roller holder further comprises a deformable lever for engaging said first fastening point or said second fastening point.

4. The curved belt conveyor of claim 3, wherein said first fastening point and said second fastening point comprise corresponding detent elements of said deformable lever and said limbs.

5. The curved belt conveyor of claim 4, wherein said deformable lever is more rigid in a region proximate a pivoting axis and less rigid in a region distal from said pivoting axis.

6. The curved belt conveyor of claim 5, wherein said retaining element further comprises a first recess between each said roller of said pair of rollers.

7. The curved belt conveyor of claim 6, wherein each said retaining element is generally vertical and comprises two pairs of roller holders fastened to each of said opposed limbs for holding two pairs of said rollers such that a superior pair of rollers guides an upper run of said conveyor belt and an inferior pair of rollers guides a lower run of said conveyor belt, and wherein said generally U-shaped retaining element comprises a second recess between said superior pair of rollers and said inferior pair of rollers.

8. A curved belt conveyor comprising:
   a) a sidewall;
   b) a conveyor belt and an application element associated with an outer periphery of said conveyor belt;
   c) a plurality of pairs of rollers guiding said application element; and
   d) a plurality of retaining elements; each said retaining element comprising a generally U-shaped profile and connected to said side wall of said curved conveyor, wherein each said retaining element further comprises:
      i) a base;
      ii) a pair of opposed limbs extending from said base; and
      iii) at least a pair of roller holders fastened to each of said opposed limbs for holding at least two of said rollers, wherein a rotation axis of at least one of said pair of rollers is pivotable in a plane parallel with said pair of opposed limbs.

9. The curved belt conveyor of claim 8, wherein said pair of roller holders is fastened to inward sides of said opposed limbs.

10. The curved belt conveyor of claim 9, wherein said roller holder further comprises a deformable lever for engaging a first fastening point or a second fastening point.

11. The curved belt conveyor of claim 10, wherein said first fastening point and said second fastening point are corresponding detent elements of said limbs and said deformable lever.

12. The curved belt conveyor of claim 11, wherein:
   a) said deformable lever comprises a detent nose for engaging a detent recess of said limbs; or
   b) said limbs comprise a detent nose for engaging a detent recess of said deformable lever.

13. The curved belt conveyor of claim 12, wherein said deformable lever is more rigid in a region proximate a pivoting axis and less rigid in a region distal from said pivoting axis.

14. The curved belt conveyor of claim 13, wherein said retaining element further comprises a first recess between each roller of said pair of rollers.

15. The curved belt conveyor of claim 14, wherein each said retaining element is generally vertical and comprises two pairs of roller holders fastened to each of said opposed limbs for holding two pairs of rollers such that a superior pair of rollers guides an upper run of said conveyor belt and an inferior pair of rollers guides a lower run of said conveyor belt, and wherein said generally U-shaped retaining element comprises a second recess between said superior pair of rollers and said inferior pair of rollers.

16. A guide for an application element associated with an outer periphery of a conveyor belt, wherein said guide is connectable to a conveyor; said guide comprising:
   a) a pair of rollers for guiding said application element; and
   b) a retaining element comprising a generally U-shaped profile comprising:
      i) a base;
      ii) a pair of opposed limbs extending from said base; and
      iii) a pair of roller holders fastened to each of said opposed limbs for holding two rollers, wherein a rotation axis of at least one of said pair of rollers is pivotable in a plane parallel with said pair of opposed limbs.

17. The guide of claim 16, wherein said roller holder further comprises a deformable lever for engaging a first fastening point or a second fastening point.

18. The guide of claim 17, wherein said deformable lever is more rigid in a region proximate a pivoting axis and less rigid in a region distal from said pivoting axis.

19. The guide of claim 18, wherein said retaining element further comprises a recess between each roller of said pair of rollers.

20. The curved belt conveyor of claim 19, wherein said first fastening point and said second fastening point are corresponding detent elements of said limbs and said deformable lever.

\* \* \* \* \*